(12) United States Patent
Bernecker

(10) Patent No.: US 9,519,465 B2
(45) Date of Patent: Dec. 13, 2016

(54) METHOD AND SYSTEM FOR GENERATING CODE

(71) Applicant: innoWake GmbH, Senden (DE)

(72) Inventor: Thorsten Bernecker, Senden (DE)

(73) Assignee: innoWake GmbH, Senden (DE)

( * ) Notice: Subject to any disclaimer, the term of this patent is extended or adjusted under 35 U.S.C. 154(b) by 0 days.

(21) Appl. No.: 13/872,897

(22) Filed: Apr. 29, 2013

(65) Prior Publication Data

US 2013/0247017 A1  Sep. 19, 2013

Related U.S. Application Data

(63) Continuation of application No. PCT/EP2011/069044, filed on Oct. 28, 2011.

(30) Foreign Application Priority Data

Oct. 28, 2010  (WO) ................. PCT/EP2010/066414

(51) Int. Cl.
  *G06F 9/45*  (2006.01)
  *G06F 9/455*  (2006.01)
  *G06F 9/44*  (2006.01)

(52) U.S. Cl.
  CPC . *G06F 8/41* (2013.01); *G06F 8/51* (2013.01); *G06F 9/45516* (2013.01); *G06F 8/30* (2013.01)

(58) Field of Classification Search
  CPC ............... G06F 8/30; G06F 8/51; G06F 8/41; G06F 9/45516
  USPC .......................................... 717/137, 146–148
  See application file for complete search history.

(56) References Cited

U.S. PATENT DOCUMENTS

| | | | | |
|---|---|---|---|---|
| 6,002,874 A | * | 12/1999 | Bahrs et al. | 717/157 |
| 6,993,751 B2 | * | 1/2006 | Bhansali et al. | 717/137 |
| 8,332,828 B2 | * | 12/2012 | Vargas | 717/137 |
| 2006/0031820 A1 | * | 2/2006 | Li | 717/137 |

OTHER PUBLICATIONS

"Switch statement", from Wikipedia, the free encyclopedia; Referenced Apr. 14, 2016 at https://en.wikipedia.org/wiki/Switch_statement.

(Continued)

*Primary Examiner* — Lewis A Bullock, Jr.
*Assistant Examiner* — Jacob Dascomb
(74) *Attorney, Agent, or Firm* — Myers Wolin, LLC

(57) ABSTRACT

A computer implemented method and system to generate final code for execution in a runtime environment, the method including creation, via a compiler, of intermediate code from destination source code, wherein the destination source code has been compiled from original source code which includes at least one jump instruction, by omitting the at least one jump instruction, the destination source code existing in a destination programming language and the original source code in a source programming language, loading the intermediate code into an intermediate code manipulation unit, and creation, via the intermediate code manipulation unit, of the final code from the intermediate code, wherein the creation comprises an insertion of at least one jump statement into the final code, and wherein the inserted at least one jump statement is functionally equivalent to the at least one omitted jump instruction.

9 Claims, 9 Drawing Sheets

(56) References Cited

OTHER PUBLICATIONS

International Search Report, mailed Mar. 13, 2012, with Written Opinion for corresponding International Application PCT/EP2011/069044.

David M. Doolin, Jack Dongarra, Keith Seymour, "JLAPACK-Compiling LAPACK Fortran to Java," May 26, 2000, pp. 1-33.

\* cited by examiner

METHOD AND SYSTEM FOR GENERATING CODE

CROSS-REFERENCE TO RELATED APPLICATIONS

This application is a continuation of International Application No. PCT/EP2011/069044, filed on Oct. 28, 2011, which claims the priority of International Application No. PCT/EP2010/066414, filed on Oct. 28, 2010, the contents of each which are hereby incorporated by reference.

AREA OF INVENTION

The invention relates to a computer implemented method for generating code for execution in a runtime environment. In addition, the invention relates to an intermediate code manipulation unit for generating code within a runtime environment as well as to a system for generating code for execution in a runtime environment.

BACKGROUND AND STATE-OF-THE-ART

In the area of operating software systems and applications there has been a long standing wish to port and run applications originally created for host systems or mainframes on more modern and powerful computer systems. This often entails offering the same functionality previously available in the software application on the destination system. However, it is often impossible to simply recompile the application's source code on the new system because compilers aren't available on the destination platform.

On top of that a concurrent goal when moving applications to a new platform is to make the source code available in a modern programming language, for example an object oriented programming language. Such a goal may manifest itself in a requirement to transform an application's source code from COBOL, Natural, or PL/1 into Java source code.

Transforming the original source code into a modern programming language enables compilation on many different platforms as such compilers are available on a vast variety of hardware platforms and operating systems. The transformed source code can then easily be compiled on the desired destination system. Additionally, the transformed programs are more easily and cost effectively maintainable and modernizable.

There are known ways to transform source code from one programming language into another automatedly. Language constructs from an original language are mapped to language constructs in a destination language. The goal of this is to create as little difference as possible between the program structure of the original application and the destination program structure, i.e., creating a statement-to-statement transformation of the original source code. This way the original source code and destination source code look very similar, indeed familiar to anyone who knows the original application code. The high resemblance guarantees optimum maintainability.

However, different design paradigms in the original and destination language often make such a statement-to-statement transformation impossible. The original and destination source code exhibit enormous differences. This is exasperated by the fact that the original programming language contains language constructs that are not available in the destination programming language.

Such language constructs are, for example, jump instructions. Procedural languages, like Natural and COBOL often use these to control program flow. Execution of the program stops at one point and continues at another. The programming language Natural has the REINPUT command that forces program execution to continue at the point of the program that last prompted user input. REINPUT may be used anywhere in Natural code.

Heavy use of jump instructions in procedural programming languages leads to large parts of the original source code requiring a transformation that doesn't employ a statement-to-statement transformation. Instead, these parts of the code have to be restructured massively or even require manual reimplementation. Even if the transformed code is semantically correct the transformed code may not be syntactically equivalent to the original code. Such a transformation hence has the disadvantage of not being recognizable compared to the original program structure.

OBJECT OF THE INVENTION

The object of the invention is to provide a method and a system that allow transforming original source code in an original programming language into a semantically identical and syntactically nearly identical destination source code in a destination programming language, whereby transformation of language constructs in the original programming language that are not available in the destination programming language is still possible. A particular object of the invention is to transform any original source code in an original programming language to source code in a destination programming language where the original source code contains jump instructions that are not available in the destination programming language.

Solution According to the Invention

According to a first aspect of the invention provides is computer implemented method to generate code from original source code, whereby the original source code includes at least one jump instruction and exists in a source programming language, the method comprising:
  creation of intermediate code from the original source code by omitting the at least one jump instruction, the intermediate code existing in a destination programming language,
  loading the intermediate code into a code manipulation unit, and
  creation, via the code manipulation unit of destination source code from the intermediate code, whereby the creation comprises an insertion of at least one source code fragment into the destination source code, whereby the inserted at least one source code fragment is functionally equivalent to the at least one omitted jump instruction, and whereby the at least one inserted source code fragment comprises
    source code for performing at least one exception handling,
    at least one loop statement inside the source code for the exception handling, and
    at least one switch statement inside the loop statement.

The solution according to this invention allows transforming programs in original source code into destination source code that has a similar structure even if the destination programming language doesn't allow jump instructions.

The invention thus allows retaining the original program's structure when it has been created in an original programming language and transformed into a new program in a modern destination language by creating the jump instructions that are not available in this modern destination language's source in its executable (object) code. This allows retaining well-known and understood programming structures from existing programs in the destination programming language. The resulting code in the destination language remains as recognizable and maintainable as the original code has been. This also increases the probability of the application in the destination programming language to execute correctly.

In addition this allows a statement-to-statement transformation of the original source code into the destination source code.

Preferred embodiments comprise the following features.

The at least one source code fragment inserted into the destination source code is adapted to perform program statements which are functionally equivalent to a static jump instruction placed in the original source code, if the destination of the jump instruction is inside the stack frame of the jump instruction.

The at least one source code fragment inserted into the destination source code is adapted to perform program statements which are functionally equivalent to a dynamic jump instruction placed in the original source code, if the destination of the jump instruction is outside the stack frame of the jump instruction.

The at least one source code fragment inserted into the destination source code is adapted to perform program statements which are functionally equivalent to a dynamic jump instruction placed in the original source code, if the destination of the jump instruction is inside the stack frame of the jump instruction.

The source code fragment inserted into the destination source code further comprises an auxiliary variable which holds the destination of the jump and which is evaluated by the switch statement.

The destination programming language comprises a programming language that does not allow jump statements of type GOTO in its source code.

The destination programming language comprises at least one of Java and a programming language which is executable in the .NET runtime environment.

The source programming language comprises a programming language that allows jump statements in its source code.

The source programming language is at least one of Cobol, Natural, and PL/1.

The method further comprising a step of creating final code from the destination source code, whereby the final code comprises hardware independent code, the final code being for execution in a runtime environment.

The runtime environment comprises a Java Virtual Machine.

According to the first aspect of the invention, further provided is a code manipulation unit which is adapted to load intermediate code which has been created from original source code and to generate the a destination source code from the intermediate code, whereby generating the destination source code comprises inserting of at least one source code fragment into the destination source code, whereby the inserted at least one source code fragment is functionally equivalent to the at least one omitted jump instruction, and whereby the at least one inserted source code fragment comprises at least one exception handling enclosing the intermediate code, at least one loop statement within the exception handling, and at least one switch statement within the loop statement.

According to the first aspect of the invention, further provided is a system for generating code, comprising:

a compiler for creation of intermediate code from original source code, whereby the original source code includes at least one jump instruction, by omitting the at least one jump instruction, the intermediate code existing in a destination programming language and the original source code in a source programming language, and a code manipulation unit which is adapted to load the intermediate code and to generate the a destination source code from the intermediate code, whereby generating the destination source code comprises inserting of at least one source code fragment into the destination source code, whereby the inserted at least one source code fragment is functionally equivalent to the at least one omitted jump instruction, and whereby the at least one inserted source code fragment comprises at least one exception handling enclosing the intermediate code, at least one loop statement within the exception handling, and at least one switch statement within the loop statement.

The at least one source code fragment inserted into the destination source code may be adapted to perform program statements which are functionally equivalent to a dynamic jump instruction placed in the original source code, if the destination of the jump instruction is outside the stack frame of the jump instruction.

The code manipulation unit may be further adapted to insert into the destination source at least one auxiliary variable which holds the destination of the jump and which is evaluated by the switch statement.

The system according may further comprise means for creating final code from the destination source code, whereby the final code comprises hardware independent code, the final code being for execution in a runtime environment.

The invention further comprises a computer program product with application code that, when loaded into a data processing unit, executes the inventive method.

According to a second aspect of the invention a computer implemented method to generate final code for execution in a runtime environment is provided, the method comprising:

Creation, via a compiler, of intermediate code from destination source code, whereby the destination source code has been compiled from a original source code which includes at least one jump instruction, by omitting the at least one jump instruction, the destination source code existing in a destination programming language and the original source code in a source programming language, Loading the intermediate code into an intermediate code manipulation unit, and Creation, via the intermediate code manipulation unit, of the final code from the intermediate code, whereby the creation comprises an insertion of at least one jump statement into the final code, and whereby the inserted at least one jump statement is functionally equivalent to the at least one omitted jump instruction.

The solution according to this invention allows transforming programs in original source code into destination source code that has a similar structure even if the destination programming language doesn't allow jump instructions. This is achieved by transforming the original source code into an intermediate source code without any jump instructions. Only when the final executable (object) code is created the jump instructions that are equivalent to jump statements are inserted. These are inserted by an intermediate code manipulation unit that is loaded with the intermediate code.

The invention thus allows retaining the original program's structure when it has been created in an original programming language and transformed into a new program in a modern destination language by creating the jump instructions that are not available in this modern destination language's source in its executable (object) code. This allows retaining well-known and understood programming structures from existing programs in the destination programming language. The resulting code in the destination language remains as recognizable and maintainable as the original code has been. This also increases the probability of the application in the destination programming language to execute correctly.

In addition this allows a statement-to-statement transformation of the original source code into the destination source code.

In preferred embodiments of the invention, one or more of the following features may be comprised:

The at least one jump statement inserted into the final code may contain exception handling.

The at least one jump statement inserted into the final code may comprise a direct jump within the final code, if the jump's destination is within the valid area of the direct jump.

The valid area is the stack frame of a subroutine from the call stack, whereby the call stack is composed of stack frames. Each stack frame corresponds to a call to a subroutine which has not yet terminated with a return. The stack frame at the top of the call stack is for the currently executing routine.

The exception handling statement may be adapted to accept and handle at least one signaling statement's exception.

The exception handling statement may be adapted to signal, upon accepting at least on signaling statement's exception, an exception if the exception handling statement is not within the valid area of the jump destination of the direct jump.

The signaling statement may be inserted into the final code through the intermediate code manipulation unit.

During compilation of the original source code into the destination source code, control data may be created that is fed to the intermediate code manipulation unit and which contains information about how signaling statements need to be inserted into the final code.

The generated intermediate code may contain the at least one signaling statement.

The destination source code may contain the at least one signaling statement.

The direct jump may be of type GOTO.

The intermediate code may comprise byte code to be interpreted by an interpreter of a virtual machine.

The destination programming language may comprise a programming language that does not allow jump statements of type GOTO in its source code.

Furthermore, the destination programming language may comprise at least one of Java and .NET. The original programming language may comprise a programming language that allows jump statements in its source code. The original programming language may be at least one of Cobol, Natural, and PL/1.

It is particularly beneficial that the original source code may be in the programming language Natural and the destination source code may be Java. Natural offers a very easy system for handling jump statements which has led to widespread use of the language in business scenarios. Java, on the other hand, has found widespread use due to its platform independence. By using the invention Natural programs can be transformed into Java programs and executed on arbitrary platforms and maintained and enhanced there.

The virtual machine may comprise a Java Virtual Machine and the intermediate code manipulation unit comprises a Java Classloader of the Java Virtual Machine.

The intermediate code manipulation unit may be derived from the Java Classloader of the Java Virtual Machine, i.e. the Classloader-Class of the Java Virtual Machine may be used as base class from which the class of the intermediate code manipulation unit may be derived.

The final code generated by the intermediate code manipulation unit may be handed over for execution to the virtual machine.

The virtual machine may comprise a Java Virtual Machine.

The final code may comprise hardware independent code.

The invention according to the second aspect further provides an intermediate code manipulation unit for generating final code for execution in a runtime environment, whereby the intermediate code manipulation unit is adapted to load intermediate code which has been compiled from original source code in an original programming language and to generate the final code from the intermediate code, whereby the creation of the final code comprises insertion of at least one jump statement into the final code, the at least one inserted jump statement being functionally equivalent to the at least one jump statement of the source code in the original programming language.

The intermediate code manipulation unit according to this invention is the tool that allows implementing the method described in this invention.

Making the intermediate code manipulation unit one that is independent and decoupled of the Java Virtual Machine (JVM) Class Loader and implementing it such that it produces executable object code that can be loaded by the JVM Class Loader and executed through interpretation by the JVM allows creating Java Byte Code for the JVM that on the one hand is a complete semantic representation of the Natural source code and on the other hand does not need to be adapted by the JVM Class Loader to insert jump statements into the Java Byte Code. An additional benefit is that the object code is executable in any JVM environment without requiring a specially adapted Class Loader or runtime manipulation unit for the destination environment.

The intermediate code may have been created from destination source code in a destination programming language, whereby the destination source code has been compiled from the original source code which contains at least one jump statement, by omitting of the at least one jump statement.

The intermediate code manipulation unit may comprise a Java Classloader.

The intermediate code manipulation unit may have been derived from a Java Classloader.

The final code may comprise hardware independent code.

The invention according to the second aspect further provides a system for generating final code for execution in a runtime environment, comprising:

A compiler for creation of intermediate code from destination source code, whereby the destination source code has been compiled from original source code that contains at least one jump statement, by omitting during compilation, whereby the destination source code exists in a destination programming language and the original source code exists in an original programming language, and an intermediate code manipulation unit that is adapted to load the intermediate code and to create the final code from the intermediate code, whereby creating the final code comprises insertion of the at least one jump statement into the final code, which is functionally equivalent to the at least one omitted jump statement of the original source code.

The intermediate code manipulation unit may comprise a Java Classloader.

If the intermediate code manipulation unit is derived from the Java Virtual Machine (JVM) Class Loader and comprises it then the intermediate code manipulation unit is part of the JVM. The intermediate code manipulation unit may be derived from a Java Classloader.

The intermediate code manipulation unit may be adapted to check before inserting a jump statement into the final code that the target for the jump statement lies within the valid area of the jump statement to be inserted.

The intermediate code manipulation unit may be further adapted to insert a jump statement into the final code that triggers a direct jump to the jump target in the final code during execution of the final code if the valid area of the jump statement to be inserted lies within the valid area of the jump's target.

The intermediate code manipulation unit may be further adapted to insert a signaling statement into the final code that signals an exception during execution of the final code, if the valid area of the jump statement to be inserted lies outside of the valid area of the jump's target.

The intermediate code manipulation unit may be further adapted to insert an exception handling statement into the final code that catches and handles the signaled exception.

The exception handling statement may contain the direct jump to the target in the final code, if the exception handling statement lies within the valid area of the jump's target.

The final code may comprise hardware independent code.

A computer program product with application code that, when loaded into a data processing unit, executes the method described above.

SHORT DESCRIPTION OF FIGURES

Further details and properties of the invention are given in the following description of the drawings in which.

DETAILED DESCRIPTION

The following shall describe an example that exists as original source code in the Natural programming language which is to be executed in a Java Virtual Machine (JVM) runtime environment after transformation. To allow running the original Natural source code in the JVM the Natural source code must first be transferred into source code in the Java programming language. A Java compiler compiles this Java source code into executable object code readable by the Class Loader of the JVM. The object code is referred to as Java Byte Code and can be executed by the Java Runtime Environment.

The invention is also applicable to other programming languages and runtime environments. The invention allows, for example, source code written in the programming language COBOL to be transformed into the programming language VB.NET which in turn can be executed in the .NET runtime environment.

Detailed Description of the Second Aspect of the Invention

Figure 1A:
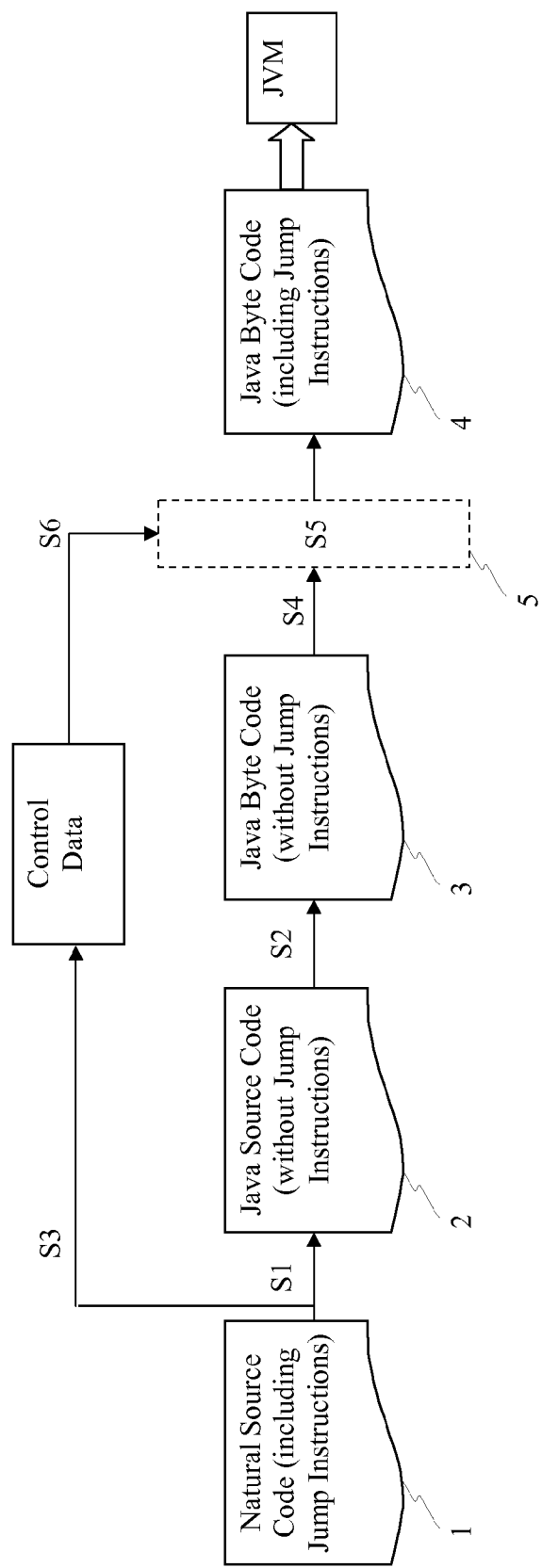
FIG. 1a illustrates a block diagram for outlining a method according to the second aspect of the invention.

FIG. 1a shows the exemplary execution for the method proposed by this invention that allows transferring source code in the original programming language into code that is executable by a runtime environment. The example transforms source code in the programming language Natural into code that is executable by the JVM. The programming language Java does not allow jump instructions.

Natural source code 1 contains one or more jump instructions. For example, the Natural source code may contain one or several REINPUT instructions that cause a jump back to a destination in the code where the user was last prompted for input. In Natural the user can be prompted with the INPUT instruction. The REINPUT instruction can be placed arbitrarily within Natural source code.

Natural source code 1 may contain several sub routines that may be nested. The REINPUT instruction may cause a jump to a point of execution outside of the sub routine that executes the REINPUT instruction.

In a first step S1 the Natural source code 1 that contains one or more jump instructions is transformed into Java source code 2, whereby the resulting Java source does not contain any corresponding jump instructions. Transformation of Natural source code 1 into Java source code 2 can be achieved through a compiler that, for example, converts Natural statements or functions into corresponding Java statements or functions.

Since Java is an object oriented language it makes sense to transform Natural source code into Java source code that consists of Java classes. Subroutines in Natural are preferably transformed into Java methods.

Translating source code in step S1 is best done by creating Java source code 2 that is syntactically similar to Natural source code 1. This is achieved by doing a line-by-line or a statement-to-statement transformation. A high degree of reusable and maintainable source code is thus created that shows strong resemblance between source code 1 and source code 2.

Since Java doesn't have jump instructions that allow direct transformation of the REINPUT statement, source code 2 is created without any corresponding jump instructions. The Java Byte Code is extended by inserting code fragments that will exhibit the behavior of the REINPUT statement once executed (see step S5).

During transformation of Natural source code 1 into Java source code 2 a step S3 leads to creation of control data for each jump instruction identified in Natural source code 2 that allow the intermediate code manipulation unit to insert code fragments into the Java Byte Code that are functionally equivalent to the jump instructions encountered in the Natural source code 1. The control data identify where in the Java Byte Code which code fragments need to be inserted. It may be saved in a control file that the intermediate code manipulation unit uses when it changes the Java Byte Code, shown in step S6. However the control data from step S3 may also be stored in the main memory of the computer system.

After transforming Natural source code 1 into Java source code 2 while omitting jump statements, Java source code 2 is compiled with a Java compiler. The result is one or more .class files 3 that contain Byte Code. Since the Java source code 2 did not contain any jump instructions the Java Byte Code 3 doesn't contain any jump instructions equivalent to those found in the Natural source code 1 either.

In a following step S4 the .class files, i.e., Java Byte Code 3, is fed into an intermediate code manipulation unit 5 that changes the Java Byte Code 3 and inserts code fragments into it as step S5 that are functionally equivalent to the jump instructions found in Natural source code 1. The intermediate code manipulation unit 5 in a step S6 peruses the control data attained in step S3. The intermediate code manipulation unit 5 then inserts jump statements into the Java Byte Code 3 according to this data.

The exact method for inserting code fragments and/or jump statements into Java Byte Code 3 will be explained now by referring to FIG. 2.

After inserting jump statements into the Java Byte Code 3 a Java Byte Code 4 is available that is semantically completely equivalent to Natural source code 1. This Java Byte Code 4 may be executed by the JVM.

In an embodiment of the invention, the intermediate code manipulation unit 5 that inserts jump statements into Java Byte Code 3 may be coded to be a manipulation unit that is independent and decoupled of the JVM Class Loader. This is achieved by an intermediate code manipulation unit 5 that creates .class files that are passed to the JVM Class Loader and in turn given to the JVM's interpreter. The advantage of such an implementation is that the Java Byte code is both semantically identical to the Natural source code 1 and does not need to be manipulated further by the JVM Class Loader to insert respective jump instructions into the Java Byte Code. In addition the .class files created by the decoupled manipulation unit, or the Java Byte Code created by the intermediate code manipulation unit 5 may be executed in arbitrary Java runtime environments without requiring a specifically modified Class Loader or a runtime manipulation unit.

Another embodiment of the invention may use an intermediate code manipulation unit 5 that has been derived from the JVM Class Loader and, if necessary, overwrites and replaces it. This derived runtime manipulation unit comprises the functionality of the JVM Class Loader and the functionality required to insert code fragments and/or jump statements into Java Byte Code 3. Therefore the intermediate code manipulation unit becomes a component of the JVM such that the respective jump statements are inserted into the Java Byte Code 3 after the intermediate code manipulation unit derived from the JVM Class Loader has loaded the Java Byte Code 3. The various Java runtime environments for different platforms thus each require the same runtime manipulation unit.

Figure 1B:
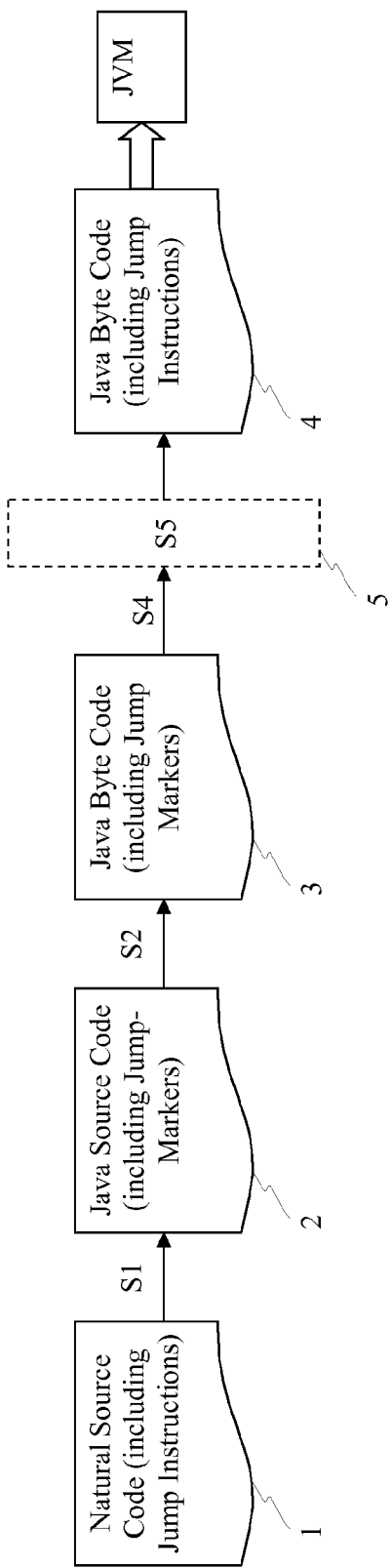
FIG. 1b illustrates a block diagram for outlining a second example of the method according to the second aspect of the invention.

FIG. 1b shows an example of executing a method according to the invention. The difference to the method shown in FIG. 1a is that no control data is generated to feed into the intermediate code manipulation unit 5 for inserting code fragments and/or jump statements.

Just as in execution of the method according to FIG. 1a in a step S1 initially the Natural source code that contains jump instructions is transformed into Java source code. For each jump instruction encountered during transformation of Natural source code 1 into Java source code 2 a jump marker is inserted into Java source code 2 that represents a jump statement. Code fragments that are functionally equivalent to the jump instruction in Natural source code 1 will be insert at the jump markers in the Java Byte Code 3 by the intermediate code manipulation unit 5. An implementation of the invention may insert a Java function as the jump marker that encodes throwing an exception, as described in FIG. 2 in greater detail. Alternatively, the jump marker may be inserted as a token, such as a Java comment.

The Java source code 2 created in this fashion in a next step S2 is compiled to Java Byte Code by a Java compiler. This compiled code also contains the markers inserted in step S1.

In the following step S4 the Java Byte Code 3 is passed to the intermediate code manipulation unit 5. It determines in the next step S5 the jump markers contained in the Java Byte Code. The intermediate code manipulation proceeds to replace the jump markers by code fragments that are functionally equivalent to the jump instructions present in Natural source code 1. Replacing is specifically necessary if the jump markers were inserted as tokens or comments into Java source code 2. If the jump markers were inserted as Java functions the intermediate code manipulation 5 may further modify the Java Byte Code 3 by additional code fragments such that these, in combination with the Java function, become functionally equivalent to the jump instructions in Natural source code 1. The resulting Java Byte Code may be executed by the JVM.

The jump marker inserted in step S1 may be a Java function reinput( ) that basically throws an exception making it syntactically close to a REINPUT instruction in Natural source code 1. The intermediate code manipulation unit 5 adds the corresponding exception handling to catch and treat the exception thrown by the reinput( ) function to the Java Byte Code 3. In addition, the intermediate code manipulation unit 5 inserts corresponding jump instructions and their destinations to the Java Byte Code 3, as shown in more detail in FIG. 2.

In the case that the jump markers were inserted in the form of tokes or comments in step S1 the intermediate code manipulation unit replaces those by a function that throws an exception much like the Java function reinput( ).

Figure 2:
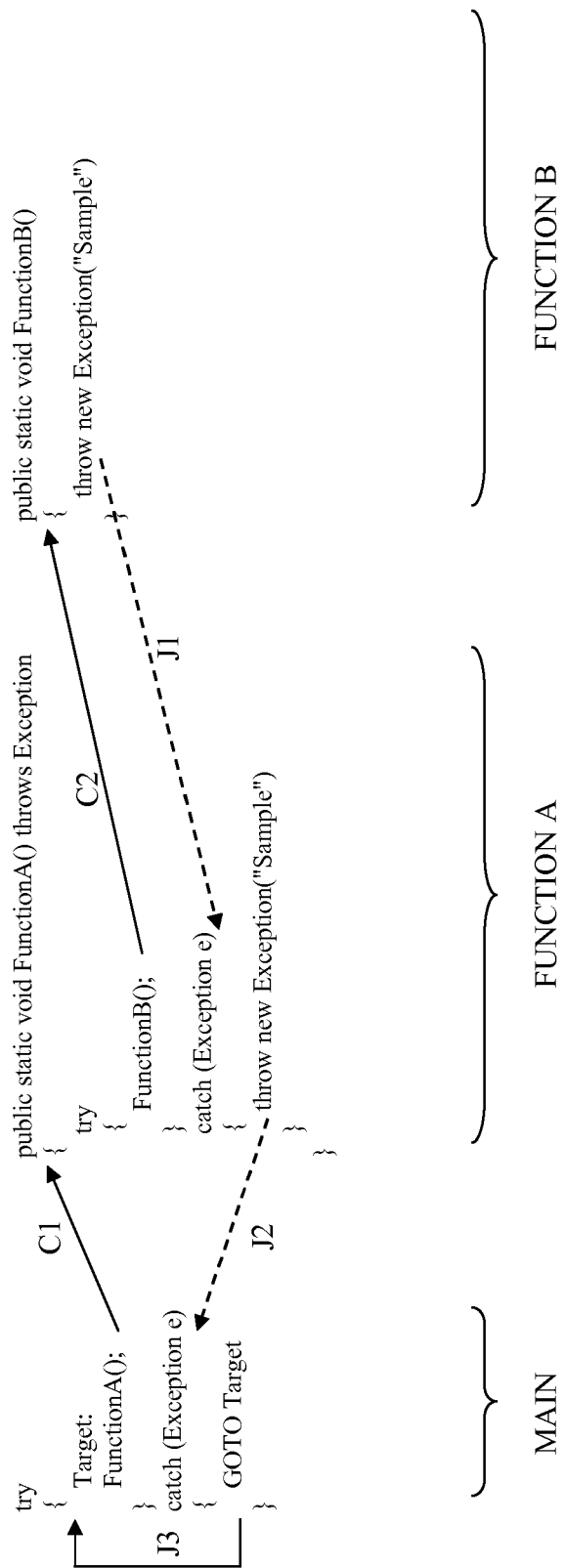
FIG. 2 illustrates the execution of a multi-stage exception condition that represents a jump statement in the original source code as exemplified in Java Byte Code.

FIG. 2 is an example of how code fragments are inserted into Java Byte Code to obtain jump instructions that are semantically like those in the Natural source code 1. For improved readability this is shown in Java syntax. Code fragments are inserted within S5 into Java Byte Code 3 by the intermediate code manipulation unit 5 according to the invention as described by referring to FIG. 1a and FIG. 1b.

The code snippet MAIN corresponds to a main program in Natural source code 1. The function FUNCTION A corresponds to a subroutine in Natural source code 1. The Main program MAIN calls (C1) the function FUNCTION A implemented as a method of the Java class that represents the main program. A further function FUNCTION B also corresponds to a subroutine in Natural source code 1. FUNCTION A calls FUNCTION B, C2. Within the original Natural source code the subroutine represented by FUNCTION A calls the subroutine represented by FUNCTION B. FUNCTION B is also implemented as a method of the Java class that represents the main program. The function FUNCTION B may be the Java function reinput( ) mentioned above.

The original Natural source code 1 contains a reinput statement (in the subroutine that corresponds to FUNCTION A) that jumps to a spot in the main program that is outside of the subroutine. This spot is marked as "Target" in FIG. 2.

In contrast to Java source code, the Java Byte Code allows jump statements to jump from one spot to another. However such jumps are only valid within an execution block or the scope of the Java program code. This scope or block may be limited, for example, to a method. Jumping is thus only valid within this method. Such jumps are executed using the GOTO instruction in the Java Byte Code.

To allow all possible jump instructions in Natural source code 1 in Java Byte Code, this GOTO instruction alone is not sufficient. It doesn't allow jumping from method calls or convoluted methods to the outside.

To allow jumps outside such scopes or blocks the invention uses exception handling.

Within the function in the Natural source code represented by the function FUNCTION A is a REINPUT statement to be executed to jump to a destination in the code to the last executed INPUT statement. At the point of the REINPUT statement within function FUNCTION A in the Java byte code an exception is thrown. The exception is thrown by calling the function FUNCTION B.

The function FUNCTION A has an exception handler that catches the exception thrown by function FUNCTION B and handles it. Monitoring exceptions thrown when function FUNCTION A is called is done with a TRY block. If function FUNCTION B causes an exception the corresponding CATCH block of function FUNCTION A catches and handles it. The handling according to the invention the exception is passed to the caller of function FUNCTION A. This passing of the exception is achieved by throwing an exception within the CATCH block. The example in FIG. 2 shows how the exception caused by function FUNCTION B is caught by function FUNCTION A and passed to the main program MAIN, J2.

If the exception caused by function FUNCTION B is a runtime exception function FUNCTION A may not require a an exception handler because the exception will be caught and handled, at the latest, by the exception handler of the main program MAIN, as given in the following description. However, if specific runtime exception handling is required, an exception handler in function FUNCTION A may still be of advantage.

The main program MAIN also contains an exception handler that catches and handles the exception either thrown by function FUNCTION A or thrown by function FUNCTION B and not caught/handled by function FUNCTION A. Catching and handling the exception caused by function FUNCTION A is done in the CATCH block of the main program MAIN. Since program execution is then within the execution block or scope of the jump target the exception handling in the main program MAIN doesn't have to throw a further exception but may use the GOTO instruction to jump to the target "Target".

The exception handlers, the statements to throw exceptions, and the GOTO statements shown in FIG. 2 are inserted as Java Byte Code into the Java Byte Code 3 by the code manipulation unit 5 in step S5. The method shown in FIG. 1b only requires inserting the exception handler, GOTO statements and the targets "Target". Throwing the exceptions, i.e., the function reinput( ) has already been inserted into the Java source code in step S1.

The Java Byte Code modified in this way now contains a number of exception handlers and GOTO statements that correspond to the REINPUT statements in Natural source code 1 including any jumps beyond execution blocks or areas of scope.

Of course the exception handling doesn't always require jumping back to the main function MAIN. If the target of the jump statement is within function FUNCTION A it is sufficient to return to function FUNCTION A from function FUNCTION B by using an exception and then executing a GOTO statement within the respective CATCH block instead of throwing an exception.

If the Natural source code 1 (or original source code in a different programming language such as COBOL or PL/1) contains different types of jump statements it may be of advantage to provide for several CATCH blocks for exception handling. The exception may be handled differently depending on the type of jump instruction.

Figure 3A:
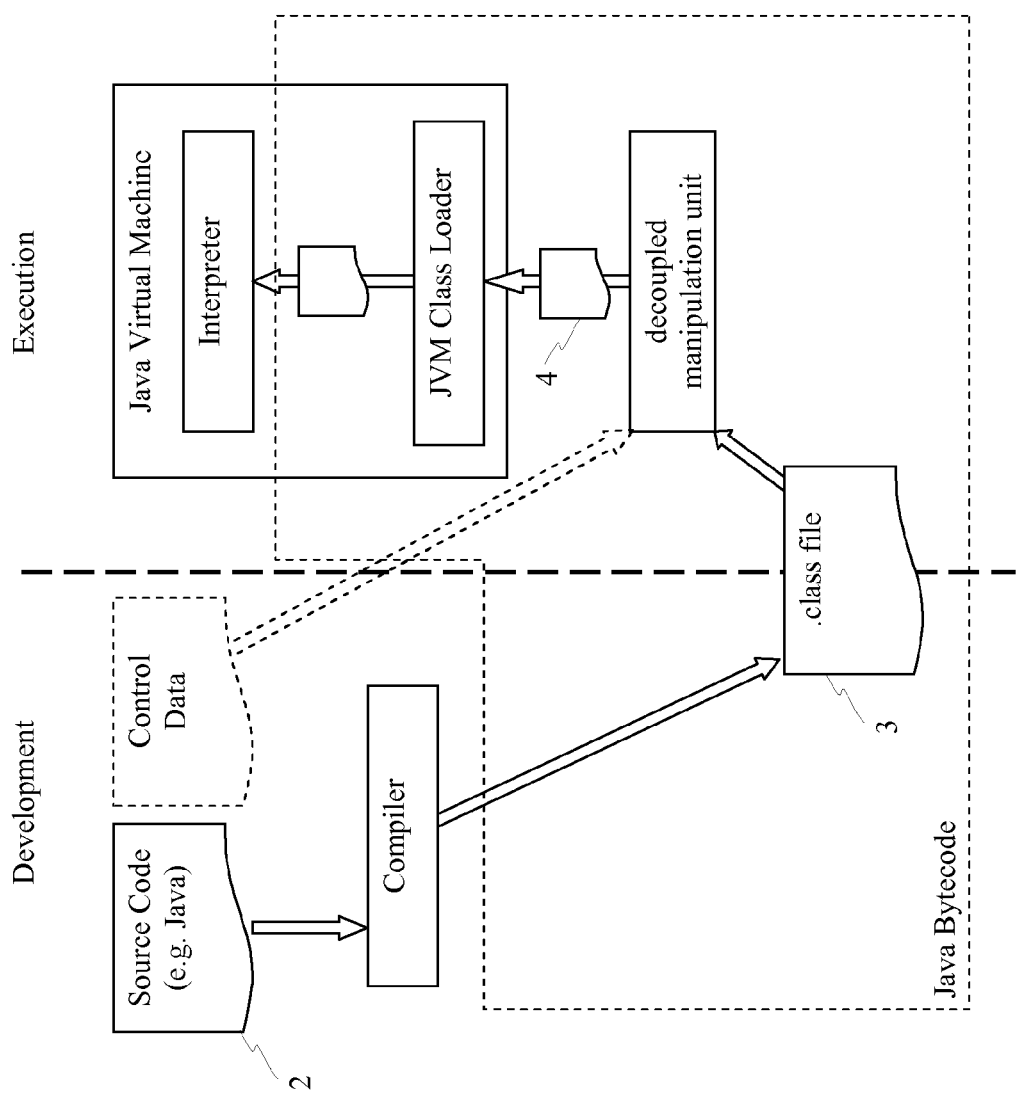
FIG. 3a-3b illustrate two possible embodiments of a system according to the second aspect of the invention.

FIG. 3a shows a first system that has been modified to execute the method according to the invention. From within a development environment the Natural source code that contains jump instructions is transformed into Java source code 2 if applicable without jump instructions. If the Java source code is created by removing jump instructions addition control data is also generated, as referred to by FIG. 1a. The Java source code is compiled with a compiler to create Java Byte Code, as one or several .class files. The runtime environment comprises the Java Virtual Machine JVM. The .class files created by the compiler are loaded into an intermediate code manipulation unit (decoupled) that inserts the respective code fragments and/or jump statements into the Java Byte Code. The code fragments correspond functionally to the jump instructions in the Natural source code and may be implemented as exception handlers, as shown by referring to FIG. 2. If the Java source code was generated by omitting jump statements as in FIG. 1a, the decoupled code manipulation unit also receives the control data created previously. Otherwise, as in FIG. 1b, the required information is contained within Java Byte Code 3. The result of the decoupled manipulation unit's process are .class files that have been complemented by jump statements. The .class files are then read by the JVM Class Loader and passed to the interpreter of the JVM for execution.

Figure 3B:
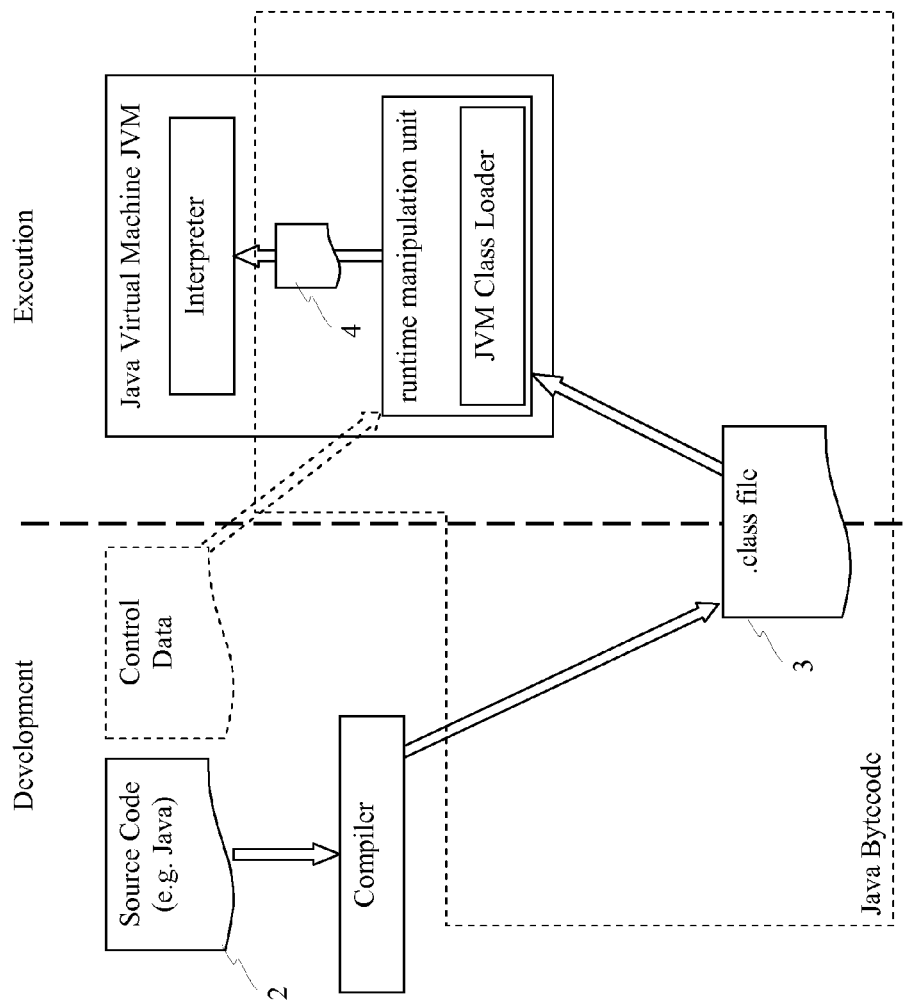

FIG. 3b shows a second system that has been modified to execute the method given by the invention. The difference to the system given in FIG. 3a is basically that the intermediate code manipulation unit (the decoupled manipulation unit in FIG. 3a) is a runtime manipulation unit replacement for the JVM Class Loader. In the case shown here the runtime manipulation unit is a derivative of the JVM Class Loader, i.e., in addition to the functionality provided by the JVM Class Loader it contains additional functionality to modify the Java Byte Code passed to it. In a concrete form the JVM Class Loader's functionality of loading byte code may be overwritten so that loading the Java Byte Code by the runtime manipulation unit already modifies the Java Byte Code.

The advantage of deriving from the JVM Class Load is the little effort required to create the runtime manipulation unit. In a different form the runtime manipulation unit is created completely independently but has the same functionality and object as explained in FIG. 3b.

Compiling Java source code 2 by a compiler into one or more .class files 3 as well as modifying Java Byte Code 3 through the runtime manipulation unit is done as shown in FIG. 3a. Here also, as long as Java source code 2 has been created from Natural source code 1 by omitting the jump instructions as shown in FIG. 1a, control data may be created that is given to the runtime manipulation unit. The runtime manipulation unit can insert code fragments into Java Byte Code 3 by using the control data that are functionally equivalent to the jump instruction in Natural source code 1. Otherwise, as in FIG. 1b, all information needed is present in Java Byte Code 3.

Detailed Description of the First Aspect of the Invention

Figure 4:
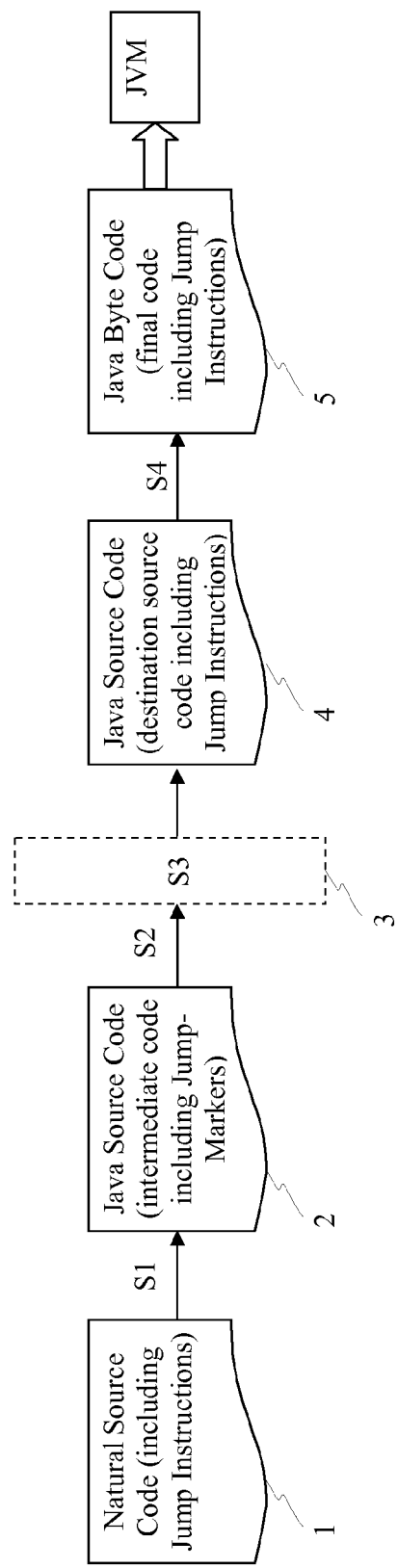
FIG. 4 illustrates a block diagram for outlining the method according to the first aspect of the invention.

FIG. 4 shows the exemplary execution for the method proposed by the first aspect of the invention that allows transferring source code in the original programming language into code that is executable by a runtime environment. In the example, source code in the programming language Natural is transformed into code that is executable by the JVM. The programming language Java, as described before, does not allow jump instructions.

The Natural source code 1 contains one or more jump instructions. For example, the Natural source code 1 may contain one or several REINPUT instructions that cause a jump back to a destination in the code where the user was last prompted for input. In Natural the user can be prompted with the INPUT instruction. The REINPUT instruction can be placed arbitrarily within Natural source code.

Natural source code 1 may contain several sub routines that may be nested. The REINPUT instruction may cause a jump to a point of execution outside of the sub routine that executes the REINPUT instruction.

In a first step S1 the Natural source code 1 that contains one or more jump instructions is transformed into Java source code 2, whereby the resulting Java source code 2 does not contain any corresponding jump instructions. Transformation of Natural source code 1 into Java source code 2 can be achieved through a compiler that, for example, converts Natural statements or functions into corresponding Java statements or functions.

Translating source code in step S1 is best done by creating Java source code 2 that is syntactically similar to Natural source code 1. This is achieved by doing a line-by-line or a statement-to-statement transformation. A high degree of reusable and maintainable source code is thus created that shows strong resemblance between source code 1 and source code 2.

Since Java doesn't have jump instructions that allow direct transformation of the REINPUT statement, source code 2 is created without any corresponding jump instructions. The Java source code 2 is extended by inserting code fragments that will exhibit the behavior of the REINPUT statement once executed (see step S5).

In a following step S2 the Java source code 2 is fed into a code manipulation unit 3 that changes the Java source code 2 by inserting code fragments into it (as step S3) that are functionally equivalent to the jump instructions found in Natural source code 1.

After manipulating the Java source code 2, a Java source code 4 is available that is semantically completely equivalent to Natural source code 1. This Java source code 4 may be compiled and executed by the JVM.

In more detail, in a step S1 the Natural source code 1 that contains jump instructions is transformed into Java source code 2. For each jump instruction encountered during transformation of Natural source code 1 into Java source code 2 a jump marker is inserted into Java source code 2 that represents a jump statement. Code fragments that are functionally equivalent to the jump instruction in Natural source code 1 will be inserted at the jump markers in the Java source code 4 by the code manipulation unit 3. An implementation of the invention may insert a Java function as the jump marker that encodes throwing an exception, as described with reference to FIG. 5a in greater detail. Alternatively, the jump marker may be inserted as a token, such as a Java comment. Further to the exception handling loop statements and switch statements are inserted for further handling the exception.

The jump marker inserted in step S1 may be a Java function that basically throws an exception making it syntactically close to a REINPUT instruction in Natural source code 1. The code manipulation unit 3 adds the corresponding exception handling to catch and treat the exception thrown by the said Java function. In addition, the code manipulation unit 3 inserts corresponding jump instructions and their destinations to the Java source code 4, as shown in more detail in FIG. 5a and FIG. 5b.

The exact method for inserting code fragments which are functionally equivalent to the original source code also will be explained by referring to FIGS. 5a and 5b.

Figure 5A:
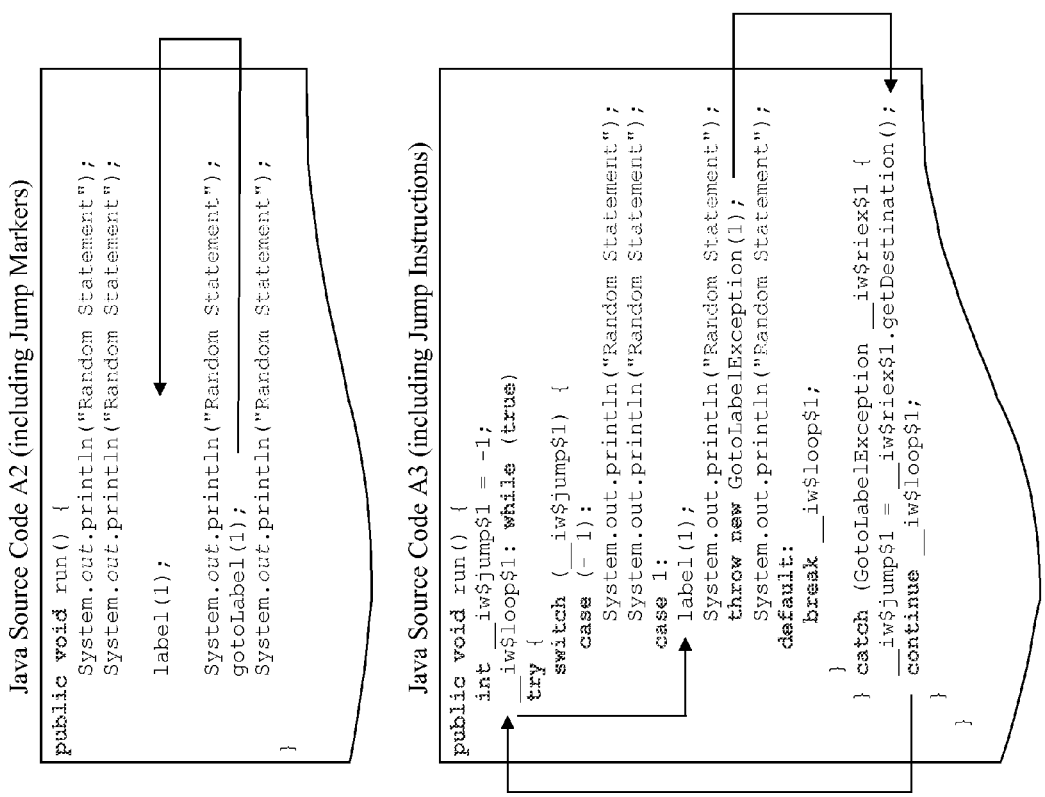
FIG. 5a-5b illustrate examples of source code in a destination programming language.
Figure 5B:
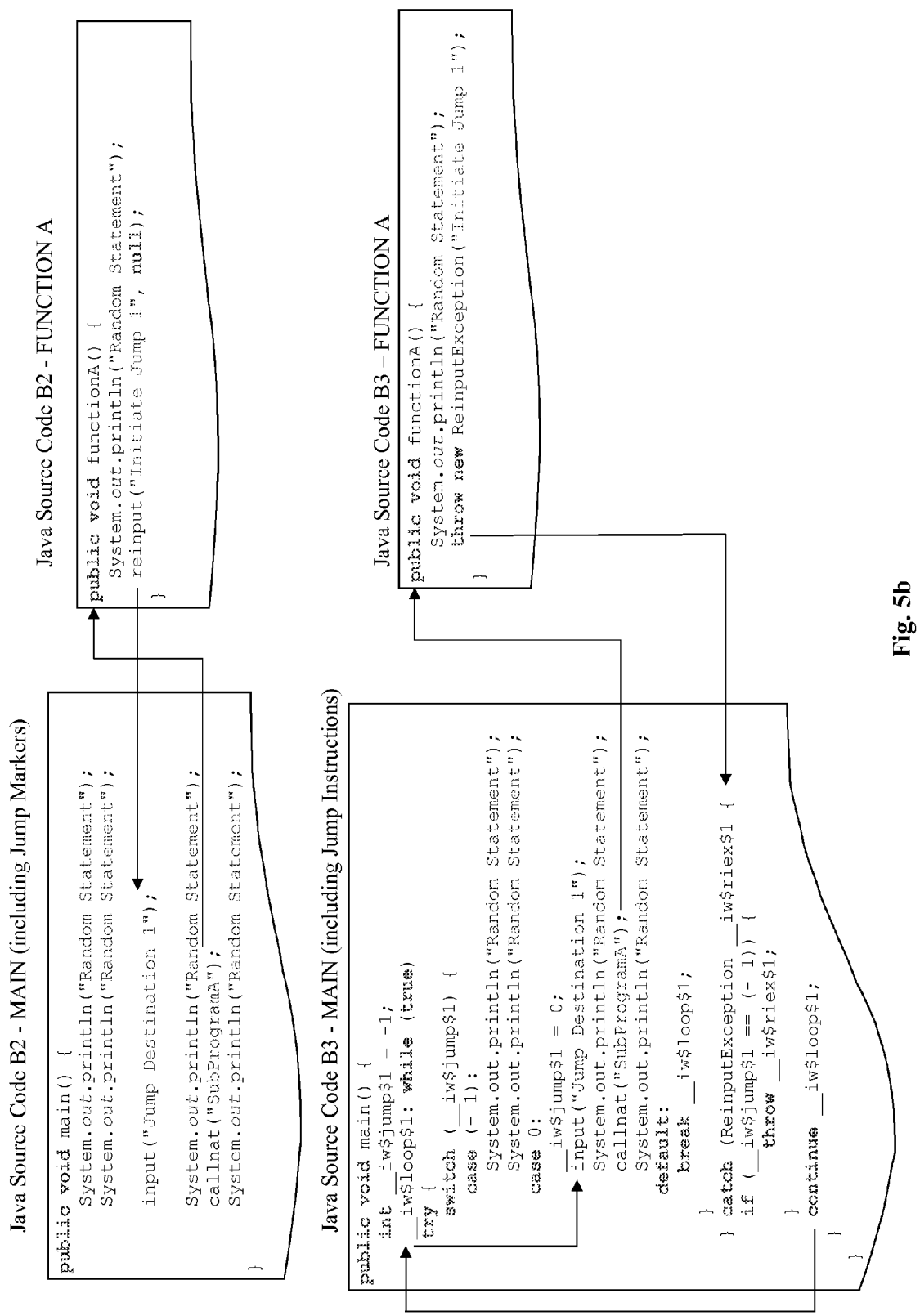

FIGS. 5a and 5b are examples of how code fragments are inserted into Java source code 4 to obtain jump instructions that are semantically like those in the Natural source code 1. Code fragments are inserted within S3 by the code manipulation unit 3 as described with reference to FIG. 4.

The code snippet A2 in FIG. 5a shows a Java source code which corresponds to a Cobol source code 1 (or PL/1 and which includes jump markers. The original Cobol source code 1 include a GOTO Statement to a specific position. This GOTO statement is transformed into a "gotoLabel" Method, which represents the original GOTO Statement and a "label" Method, which marks the jump destination.

The code snippet A3 in FIG. 5a shows a Java source code which includes the code fragment equivalent to the jump instruction in the original Cobol source code 1.

The instruction "throw new GotoException" throws an exception which stops the processing. The corresponding catch block catches the exception and handles it. The code for the exception handling (try and catch) encloses the Java source code. In order to continue the processing at the destination of the jump a loop instruction (while (true) and continue) is inserted inside the code for the exception handling. Further to the loop statement a switch statement (switch case) is inserted inside the loop. The code which belong to the case branches of the switch statements handles the processing at the destination of the jump. The code snippet B2 in FIG. 5b shows a Java source code 2 which corresponds to a Natural source code 1 and which includes jump markers. The original Natural source code 1 includes a Reinput-Statement which causes a jump to the last input Statement. Reinputs have the possibility to jump to a dynamic position (to the last input Statement) and they have the possibility to jump back to a previous stack frame, i.e. to jump to a destination outside the current function.

The Reinput-Statement of the Original source code 1 is transformed into a "reinput" Method (inside the function B2-FUNCTION A) and the Input-Statement of the Original source code 1 is transformed to a "input" Method (inside the function B2-MAIN), which marks the jump destination.

The instruction "throw new GotoException" (inside B3 FUNCTION A) throws an exception which stops the processing. The corresponding catch block (inside FUNCTION B3 MAIN) catches the exception and handles it. The code for the exception handling (try and catch) encloses the Java source code. In order to continue the processing at the destination of the jump a loop instruction (while (true) and continue) is inserted inside the code for the exception handling. Further to the loop statement a switch statement (switch case) is inserted inside the loop. The code which belong to the CASE branches of the switch statement handles the processing at the destination of the jump. The destination of the jump, i.e. the last input Statement is stored with an auxiliary variable "_iw$jump$1". The auxiliary variable is evaluated by the switch statement (switch(_iw$jump$1)).

In order to trigger a jump the Reinput-Statement of the Original source code 1 is replaced by an exception (throw new ReinputException). The thrown exception is caught by the exception handler (catch (ReinputException)). In the code sample B3-FUNCTION A the destination of the jump is outside the function, i.e. outside the stack frame of the function. Thus, when the exception is thrown inside the function B3-FUNCTION A, the stack is unwound (i.e., entries are removed from the stack) until an exception handler is found (in the example the respective exception handler is found in function B3-MAIN) that is prepared to handle (catch) the exception. The exception is caught by the exception handler handled as described with reference to FIG. 5a.

Figure 6:
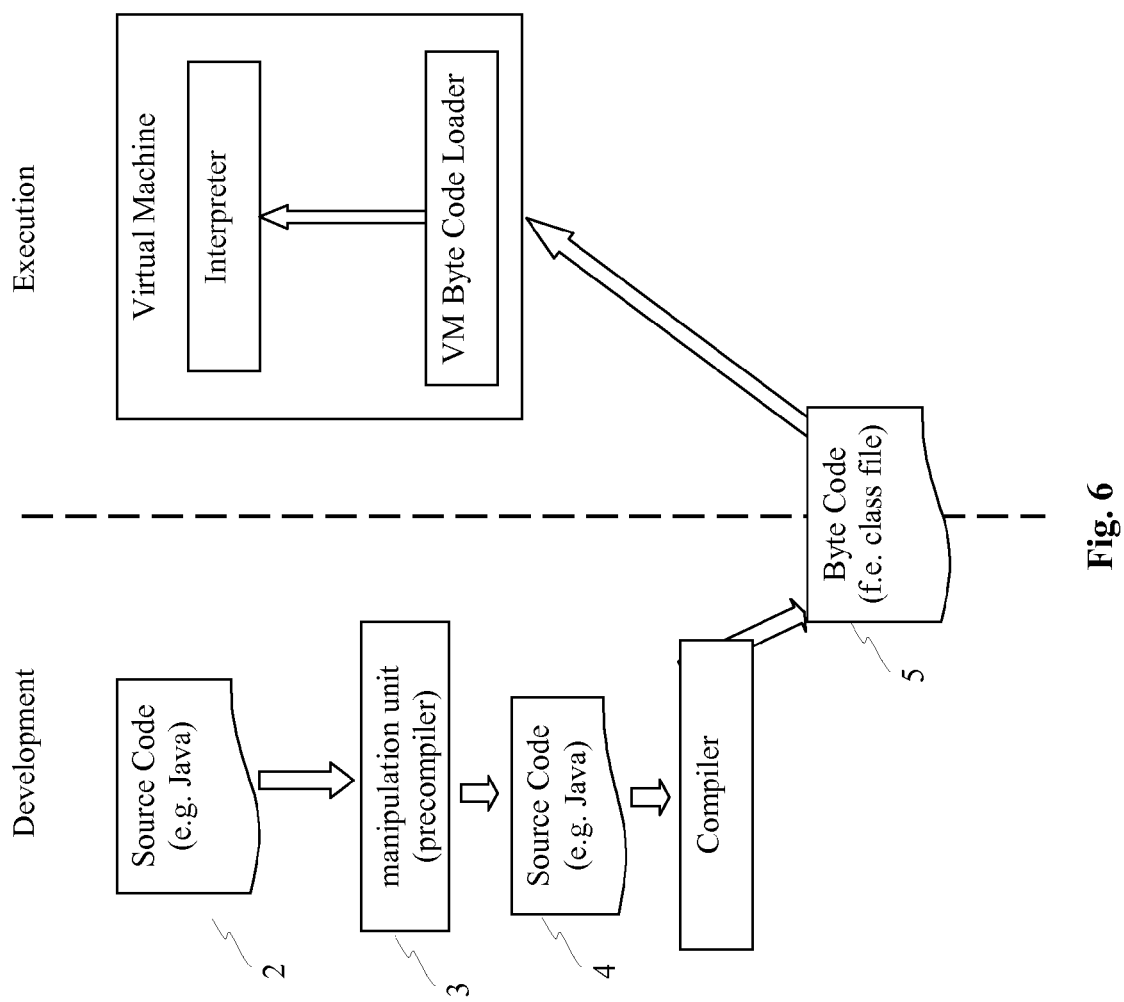
FIG. 6 depicts an embodiment of a system according to the invention for executing the method according to the first aspect of the invention.

FIG. 6 shows a system that has been modified to execute the method according to the first aspect of the invention. From within a development environment the Natural source code that contains jump instructions is transformed into Java source code 2 which includes jump markers. The Java source code is manipulated with a manipulation unit (pre-compiler) to create Java source code 4 which contains code fragments functionally equivalent to the jump instruction in the Natural source code. The manipulated source code 4 is compiled by a compiler to create Java Byte Code which is executable by a Java Virtual Machine.

The runtime (execution) environment comprises the Java Virtual Machine JVM or a .NET runtime environment. The .class files created by the compiler are loaded into the Java Virtual Machine and executed by the Java Virtual Machine.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

What is claimed is:

1. A non-transitory computer readable medium comprising computer program application code that, when loaded into a data processing unit, executes a method to generate code from original source code, wherein the original source code includes at least one jump instruction and exists in a source programming language, the method comprising:
   creating, by a compiler, of intermediate code from the original source code by omitting the at least one jump instruction and inserting a jump marker for each omitted jump instruction into the intermediate code, the intermediate code existing in a destination programming language,
   loading the intermediate code into a code manipulation unit, and
   creating, via the code manipulation unit, of destination source code from the intermediate code, the destination source code being in the destination programming language, wherein the creating comprises replacing each jump marker in the intermediate code with at least one source code fragment, wherein each of the at least one source code fragments is functionally equivalent to a corresponding omitted jump instruction associated with a respective jump marker, and wherein each of the at least one inserted source code fragments comprises:
      at least one loop statement inside the source code for the exception handling,
      a try block and a catch block, the try block and the catch block being inserted inside the at least one loop statement, an instruction which throws an exception in order to continue the processing at a destination of the corresponding omitted jump instruction, instructions within the catch block that catches the exception and continues execution using a switch statement, the switch statement handling the processing at the destination of the corresponding omitted jump instruction using a plurality of case branches, and an auxiliary variable which stores the destination of the corresponding omitted jump instruction and which is evaluated by the switch statement.

2. The non-transitory computer readable medium of claim 1, wherein the at least one source code fragment inserted into the destination source code performs program statements which are functionally equivalent to at least one of:

a static jump instruction placed in the original source code, if the destination of the jump instruction is inside the stack frame of the jump instruction;

a dynamic jump instruction placed in the original source code, if the destination of the jump instruction is outside the stack frame of the jump instruction; and a dynamic jump instruction placed in the original source code, if the destination of the jump instruction is inside the stack frame of the jump instruction.

3. The non-transitory computer readable medium of claim 1, wherein the destination programming language comprises a programming language that does not allow jump statements of type GOTO in its source code.

4. The non-transitory computer readable medium of claim 1, wherein the destination programming language comprises at least one of Java, and a programming language which is executable in the NET runtime environment.

5. The non-transitory computer readable medium of claim 1, wherein the source programming language comprises a programming language that allows jump statements in its source code.

6. The non-transitory computer readable medium of claim 1, wherein the source programming language comprises at least one of Cobol, Natural, and PL/1.

7. The non-transitory computer readable medium of claim 1, the method further comprising a step of creating final code from the destination source code, wherein the final code comprises hardware independent code, the final code being for execution in a runtime environment.

8. The non-transitory computer readable medium of claim 1, wherein the at least one jump instruction is a GOTO statement, and wherein the destination of the jump is contained in the instruction which throws the exception.

9. The non-transitory computer readable medium of claim 1, wherein the source programming language is Natural, and the at least one jump instruction is a REINPUT statement, the REINPUT statement forcing computer program execution to continue at the point of the computer program that last prompted user input, and wherein the destination of the jump stored by the auxiliary variable is at a most recently used INPUT statement.

* * * * *